United States Patent Office 3,686,188
Patented Aug. 22, 1972

3,686,188
N-BENZOFURYLMETHYL-ARYL-ALKYLENEIMINES
Charles Ferdinand Huebner, Chatham, N.J., assignor to Ciba-Geigy Corporation, Ardsley, N.Y.
No Drawing. Filed June 30, 1970, Ser. No. 51,366
Int. Cl. C07d *31/28, 31/48*
U.S. Cl. 260—294.8 C    3 Claims

ABSTRACT OF THE DISCLOSURE

N - (2,3 - dihydrobenzofurylmethyl) - arylalkyleneimines, e.g. those of the formula

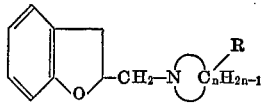

R = iso- or heterocyclic aryl radical
n = 4–7 quaternaries and salts thereof exhibit hypotensive effects.

SUMMARY OF THE INVENTION

The present invention concerns and has for its object the provision of new N - [1 - (2,3 - dihydrobenzofuryl)-alkyl]-arylalk(en)yleneimines, more particularly of those corresponding to Formula I

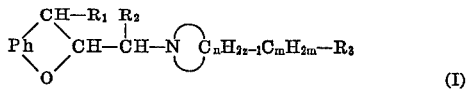
(I)

wherein Ph is a 1,2-phenylene radical, each of $R_1$ and $R_2$ are hydrogen or lower alkyl, $R_3$ is an iso- or heterocyclic aryl radical, $n$ is an integer from 4 to 7, $z$ is $n$ or $n-2$ and $m$ is an integer from 0 to 4, of quaternaries or salts thereof, of corresponding pharmaceutical compositions and of methods for the preparation of these products, which are useful as antihypertensives, for exaample, in the management and treatment of essential hypertension, vasospastic conditions and toxemia of pregnancy.

DESCRIPTION OF THE PREFERRED EMBODIMENTS

The 1,2-phenylene radical Ph in Formula I is unsubstituted or substituted by one or more than one, preferably one or two of the same or of different substituents attached to any of the positions available for substitution. Such substituents are, for example, lower alkyl, e.g. methyl, ethyl, n- or i-propyl or -butyl, etherified hydroxy or mercapto, such as lower alkoxy, alkylenedioxy or alkylmercapto, e.g. methoxy, ethoxy, n- or i-propoxy or -butoxy; methylenedioxy; methyl- or ethylmercapto; esterified hydroxy, such as halogeno, e.g. fluoro, chloro or bromo; trifluoromethyl, nitro or amino, particularly dilower alkylamino, e.g. dimethylamino or diethylamino, or acyl, preferably lower alkanoyl, e.g. acetyl, propionyl or butyryl. The term "lower," referred to above or hereinafter in connection with organic radicals or compounds respectively, defines such with up to 7, preferably up to 4, carbon atoms. Preferred radicals Ph are 1,2-phenylene, (lower alkyl)-1,2-phenylene, mono- or di-(lower alkoxy)-1,2 - phenylene, (lower alkylenedioxy) - 1,2 - phenylene, (lower alkylmercapto) - 1,2 - phenylene, (halogeno)-1,2-phenylene, (trifluoromethyl)-1,2-phenylene, (nitro)-1,2-phenylene, (di-lower alkylamino)-1,2-phenylene or (lower alkanoyl)-1,2-phenylene.

Each of the radicals $R_1$ and $R_2$ represent preferably hydrogen, but also lower alkyl, e.g. that mentioned above, especially methyl.

The lower alkylene or alkenylene radical $C_nH_{2n-1}$ or $C_nH_{2n-3}$, carrying the aryl or aralkyl radical $R_3-C_mH_{2m}$ at any ring-carbon atom thereof, preferably at such atom separated from the imino nitrogen atom by one or two carbon atoms, is preferably derived from 1,4-butylene or -but-2-enylene, 1,4- or 1,5-pentylene or -pent-2-enylene, further from 1,4-, 1,5-, 2,5- or 1,6-hexylene, - hex-2 or 3-enylene, -heptylene or -hept-2 or 3-enylene.

An alkylene radical $C_mH_{2m}$ preferably represents methylene, but also, for example, 1,1- or 1,2-ethylene, 1,1-, 1,2- or 1,3-propylene or -butylene.

The aromatic radical $R_3$ is preferably a monocyclic iso- or heterocyclic aryl radical, the latter of which contains advantageously but one heteroatom, such as a nitrogen, oxygen or sulfur atom. Said aromatic radicals are unsubstituted or substituted as shown for the phenylene radical Ph. $R_3$ preferably represents H—Ph as listed above, pyridyl, (lower alkyl)-pyridyl, furyl, (lower alkyl)-furyl, thienyl or (lower alkyl)-thienyl.

Quaternaries of the compounds of Formula I are preferably lower alkyl quaternaries and salts, advantageously acid addition salts.

The compounds of the invention exhibit valuable pharmacological properties, especially hypotensive and antihypertensive effects. This can be demonstrated in animal tests, using advantageously mammals, such as dogs, as test objects. The compounds of the invention can be applied enterally or parenterally, for example, orally (or directly into the lumen of the small intestine) or intravenously, for example, within gelatin capsules or in the form of aqueous solutions or suspensions respectively. The applied dosage may range between about 0.5 and 10 mg./kg./day, preferably between about 1 and 5 mg./kg./day, advantageously at about 3 mg./kg./day. The lowering effect on the blood pressure is observed either in the anesthetized normotensive dog after i.v. drug administration or in the unanesthetized, renal hypertensive dog after oral drug administration, as described, for example, by A. J. Plummer in Medicinal Chemistry VII (1967), Antihypertensive Agents, page 67 (Academic Press Inc., N.Y.). Accordingly, the compounds of the invention are useful antihypertensive agents, for example, in the treatment or management of primary or secondary hypertension, e.g. essential or renal hypertension. They are also useful intermediates in the preparation of other valuable products, especially of pharmacologically active agents.

Particularly useful are the compounds of Formula I, in which Ph is 1,2-phenylene, (lower alkyl)-1,2-phenylene, mono- or di-(lower alkoxy)-1,2-phenylene, (lower alkylenedioxy)-1,2-phenylene, (lower alkylmercapto)-1,2-phenylene, (halogeno) - 1,2 - phenylene, (trifluoromethyl)-1,2-phenylene, (nitro) - 1,2 - phenylene (di-lower alkylamino)-1,2-phenylene or (lower alkanoyl)-1,2-phenylene, each of $R_1$ and $R_2$ is hydrogen or lower alkyl, $R_3$ is phenyl, (lower alkyl)-phenyl, mono- or di-(lower alkoxy)-phenyl, (lower alkylenedioxy)-phenyl, (lower alkylmercapto)-phenyl, (halogeno)-phenyl, (trifluoromethyl)-phenyl, nitro)-phenyl, (di-lower alkylamino)-phenyl, (lower alkanoyl)-phenyl, pyridyl, (lower alkyl)-pyridyl, furyl, (lower alkyl)-furyl, thienyl or (lower alkyl)-thienyl, $n$ is an integer from 4 to 7, $z$ is $n$ or $n-2$ and $m$ is an integer from 0 to 4, lower alkyl quaternaries or therapeutically useful acid addition salts thereof.

Preferred are the compounds of Formula I, in which Ph is 1,2-phenylene, (lower alkyl)-1,2-phenylene, mono- or di-(lower alkoxy)-1,2-phenylene, (lower alkylmercapto)-1,2-phenylene, (halogeno) - 1,2 - phenylene, (trifluoromethyl)-1,2-phenylene or (lower alkanoyl)-1,2-phenylene, each of $R_1$ and $R_2$ is hydrogen or methyl, $R_3$ is phenyl, (lower alkyl)-phenyl, mono- or di-(lower alkoxy)-phenyl, (lower alkylmercapto)-phenyl, (halogeno)-phenyl, (trifluoromethyl)-phenyl, (lower alkanoyl)-phneyl, pyridyl or (lower alkyl)-pyridyl, $C_nH_{2z-1}$ is 1,4-butylene or but-2-enylene, 1,4- or 1,5-pentylene or -pent-2-enylene, $m$ is the integer 0 or 1 or therapeutically useful acid addition salts thereof.

Especially valuable are compounds of Formula II

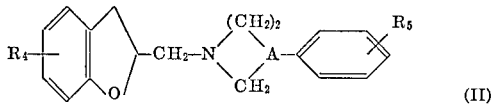

(II)

in which each of $R_4$ and $R_5$ is hydrogen, methyl, methoxy or chloro and A is

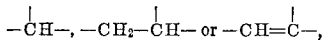

or therapeutically useful acid addition salts thereof which, when applied orally or into a loop of the small intestine of normal or renal hypertensive dogs in a preferred dosage range between about 1 and 5 mg./kg./day, show outstanding hypotensive effects.

The compounds of this invention are prepared according to known methods. A preferred process for their preparation consists in:

(a) Condensing compounds of the formulae

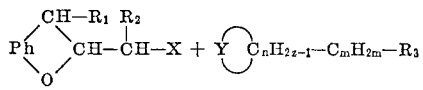

in which X is reactively esterified hydroxy or amino, Y represents two reactively esterified hydroxies or imino and both X and Y together contain one nitrogen atom only or (b) Reducing or dehydrating a compound of the formula

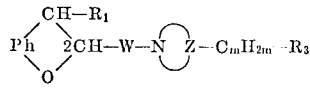

or the 2-dehydro derivative thereof, wherein W is lower alkylidene, 1-hydroxy-alkylidene or carbonyl, Z is derived from alkylene, alkenylene, hydroxyalkylene, mono- or dioxoalkylene or -alkenylene with 4 to 7 ring-carbon atoms and both W and Z together contain at least one oxygen atom or, in the oxacyclic ring, a double bond between the 2- and 3-position and, if desired, converting a resulting compound into another compound of the invention.

A reactive ester of the alcohols mentioned under item (a) is, for example, that of a mineral or sulfonic acid, e.g. sulfuric, methane, ethane, benzene or p-toluene sulfonic acid, but preferably that of a hydrohalic acid, e.g. hydrochloric or hydrobromic acid.

The above-mentioned reactions are carried out according to standard methods, in the presence or absence of diluents, preferably such as are inert to the reagents and are solvents thereof, of catalysts, condensing or reducing agents respectively and/or inert atmospheres, at low temperatures, room temperature or elevated temperatures, at atmospheric or superatmospheric pressure. Condensing agents are especially used in the reaction with said reactive esters, in order to eliminate the acid formed. They are basic agents, for example, alkali or alkaline earth metal carbonates or lower alkoxides, or organic nitrogen bases, such as pyridine or collidine, advantageously aliphatic tertiary amines, such as tri-lower alkylamines, e.g. triethylamine. The reduction according to item (b) for example, of oxo groups, advantageously present in carbamoyl groups, is preferably carried out with the use of complex light metal hydrides, such as alkali metal aluminum or borohydrides, e.g. lithium aluminum hydride, or by electrolytic reduction, whereas the elimination of a hydroxy group or double bond is advantageously carried out by hydrogenation, e.g. with hydrogen in the presence of hydrogenation catalysts, e.g. platinum or nickel. The dehydration of compounds containing a hydroxy group at a tertiary ring-carbon atom, is advantageously carried out under acidic conditions, preferably in the presence of mineral acids, e.g. hydrochloric, sulfuric or polyphosphoric acid.

Resulting compounds of the invention can be converted into each other according to known methods. For example, any nitro group present can be reduced to the amino group, or a nitro group introduced by nitration, e.g. the treatment with nitric acid under anhydrous conditions or the treatment of nitrates with strong acids, e.g. trifluoroacetic acid. Acyl groups can be introduced according to the Friedel-Crafts reaction, i.e. the treatment with acyl halides in the presence of aluminum chloride. A primary amino group present, can be substituted with the use of corresponding reactive esters of alcohols, or converted into another group accessible by the Sandmeyer replacement reaction, i.e. diazotization and replacement of the diazonium group formed, e.g. by hydroxy, when hydrolysis is applied, or by halogen when the halides or tetrafluoroborates are heated, advantageously in the presence of copper powder or cuprous halides. Resulting unsaturated compounds can be hydrogenated, e.g. under conditions similar to those mentioned under item (b) for the reduction of the 2-dehydro derivatives. Finally, resulting bases can be quaternized, for example, with the use of lower alkyl halides, e.g. the corresponding chlorides, bromides or iodides.

The compounds of the invention are obtained in the free form or in the form of their salts, depending on the conditions under which the process is carried out; the salts are also included in the present invention. Salts that are obtained can be converted into the free bases in known manner, for example, with alkalies or ion exchangers. Free bases that are obtained can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4 - aminobenzoic, anthranilic, 4 - hydroxybenzoic, salicylic, 4 - aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic, sulfanilic or cyclohexylsulfamic acid; methionine, tryptophan, lysine and arginine.

These or other salts of the invention, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the amines mentioned under item (a) can be used in the form of their alkali metal salts and the alcohols of (b) as reactive esters. Mainly, those starting materials should be used in the process of the invention that lead to the formation of those compounds indicated above as being specially valuable.

The starting material used in known or, if new, can be prepared according to known methods, e.g. analogous to those illustrated in the examples herein or by U.S. Pat. No. 3,470,185. Thus, for example, the reactive esters of the glycols mentioned under item (a) (Y represents, for example, 2 halogen atoms) can be prepared from the corresponding aryl- or aralkyl-alkane- or alkene-dicarboxylic acids by reduction, e.g. with said complex light metal hydrides and the glycols obtained, reactively esterified, e.g. with the use of thionyl, phosphorus or arylsulfonyl halides. Said dicarboxylic or corresponding glycolic acids can similarly be converted into their functional acid derivatives, e.g. their halides which, upon condensation according to (a) with compounds in which X is amino, yield the corresponding compounds mentioned under item (b). Other oxo compounds, not containing a carbamoyl moiety can also be prepared analogous to reaction (a) from compounds wherein X is halogen and N-benzyl-derivatives of corresponding oxo-imines, whereupon the resulting quaternary adduct is debenzylated by reduction. In case the oxo-imine did not contain the $$R_3-C_mH_{2m}$$

group, this can subsequently be introduced by reacting the ketone obtained with the corresponding aromatic or araliphatic Grignard compound, thus yielding compounds in which Z is hydroxyalkylene.

Starting materials or final products that are mixtures of isomers, can be separated into the single isomers by methods in themselves known, e.g. by fractional distillation, crystallization and/or chromatography. Racemic products can likewise be resolved into the optical antipodes, for example by separation of diastereomeric salts thereof, e.g. by the fractional crystallization of d- or l- tartrates, -malates, -mandelates or -camphor sulfonates.

The pharmacologically active compounds of the invention are useful in the manufacture of pharmaceutical compositions comprising an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75%, preferably about 1 to 50%, of the active ingredient.

The following examples are intended to illustrate the invention and are not to be construed as being limitations thereon. Temperatures are given in degrees centigrade, and all parts wherever given are parts by weight.

Example 1

The mixture of 3.0 g. 2-bromomethyl-5-methoxy-2,3-dihydrobenzofuran, 2.0 g. 4-phenylpiperidine, 30 ml. isopropanol and 2.8 g. sodium carbonate is refluxed for 72 hours while stirring and evaporated in vacuo. The residue is taken up in diethyl ether, the mixture filtered and the residue washed with diethyl ether. The filtrate is washed with water, extracted with 5% hydrochloric acid and the acidic solution made basic with aqueous ammonia. It is extracted with diethyl ether, the extract dried, filtered and evaporated. The residue is taken up in the minimum amount of ethanol, the solution acidified with ethanolic hydrogen chloride and the precipitate formed filtered off, to yield the 1-(5-methoxy-2,3-dihydro-2-benzofurylmethyl)-4-phenylpiperidine hydrochloride of the formula

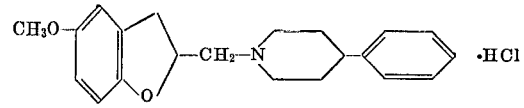

melting at 196–198°.

In the analogous manner, the 1-(5-methoxy-2,3-dihydro-2-benzofurylmethyl)-4-(2-chlorophenyl)-piperidine hydrochloride, melting at 215–217°, is prepared from equivalent amounts of the corresponding starting materials.

Example 2

The mixture of 5.6 g. 2-bromomethyl-5-methoxy-2,3-dihydrobenzofuran, 3.3 g. 4-phenyl-3-piperidine, 58 ml. isopropanol and 5.6 g. sodium carbonate is refluxed for 72 hours and evaporated in vacuo. The residue is taken up in diethyl ether, the mixture filtered, the residue washed with diethyl ether and the filtrate extracted with 5% hydrochloric acid. The acidic solution is made basic with ammonia, extracted with diethyl ether and the extract washed with water. After drying, the ethereal solution is evaporated, to yield the 1-(5-methoxy-2,3-dihydro-2-benzofurylmethyl)-4-phenyl-3-piperidine of the formula

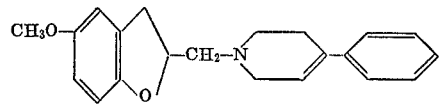

melting at 98–102°.

Example 3

The mixture of 4.85 g. 2-bromomethyl-5-methoxy-2,3-dihydrobenzofuran, 3.83 g. 4-(2-methoxyphenyl)-piperidine, 50 ml. isopropanol and 5 g. sodium carbonate is refluxed for 72 hours while stirring and evaporated in vacuo. The residue is taken up in diethyl ether, the mixture filtered and the residue washed with diethyl ether. The filtrate is extracted with 5% hydrochloric acid, the acidic solution made basic with ammonia and extracted with diethyl ether. The extract is dried, filtered, evaporated, the residue taken up in the minimum amount of isopropanol and the solution acidified with isopropanolic hydrogen bromide, to yield the 1-(5-methoxy-2,3-dihydro-2-benzofurylmethyl)-4-(2-methoxyphenyl)-piperidine hydrobromide of the formula

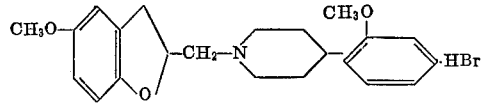

melting at 199–204°.

Example 4

The mixture of 1 g. 1-(5-methoxy-2,3-dihydro-2-benzofurylmethyl)-4-hydroxy-4-phenylpiperidine hydrochloride, 20 ml. acetic acid and 5 ml. concentrated hydrochloric acid is refluxed overnight and evaporated in vacuo. The residue is taken up in water, the mixture made basic with aqueous ammonia and extracted with diethyl ether. The extract is washed with water, dried and evaporated, to yield the 1-(5-methoxy-2,3-dihydro-2-benzofurylmethyl)-4-phenyl-3-piperidine, melting at 98–102°; it is identical with that obtained according to Example 2.

The starting material is prepared as follows: The mixture of 6 g. 2-bromomethyl-5-methoxy-2,3-dihydrobenzofuran, 4.4 g. 4-hydroxy-4-phenylpiperidine, 60 ml. isopropanol and 6 g. sodium carbonate is refluxed for 72 hours and worked up as described in Example 1, to yield the 1-(5-methoxy-2,3-dihydro-2-benzofurylmethyl)-4- hydroxy-4-phenylpiperidine hydrochloride melting at 206–209°.

Example 5

The solution of 10 g. N-(5-methoxy-2,3-dihydro-2-benzofurylmethyl)-β-(2-methoxyphenyl) - glutarimide in 100 ml. tetrahydrofuran is added dropwise to the suspension of 2 g. lithium aluminum hydride in 100 ml. diethyl ether while stirring. After refluxing overnight and cooling, 2 ml. water, 4 ml. 12% aqueous sodium hydroxide and 6 ml. water are added, the mixture filtered and the filtrate evaporated in vacuo. The residue is taken up in diethyl ether and the solution worked up as described in Example 3, to yield the 1 - (5 - methoxy - 2,3 - dihydro-2-benzofurylmethyl)-4-(2-methoxyphenyl) - piperidine hydrobromide melting at 199–204°.

The starting material is prepared as follows: The solution of 10 g. β-(2-methoxyphenyl)-glutarimide in 30 ml. dimethylformamide is added dropwise to the suspension of 2.5 g. 50% sodium hydride in mineral oil and 50 ml. dimethylformamide while stirring under nitrogen. After 2 hours, the mixture is heated at the steam cone for 1 hour, cooled and the solution of 11.1 g. 2-bromomethyl-5-methoxy-2,3-dihydrobenzofuran in 30 ml. toluene is added dropwise while stirring, whereupon the mixture is stirred at the steam bath overnight. After cooling, 10 ml. water are added dropwise and the mixture evaporated in vacuo. The residue is triturated with water, filtered off, washed with water and dried, to yield the N-(5-methoxy-2,3-dihydro-2-benzofurylmethyl)-β-(2 - methoxyphenyl)-glutarimide, which is used as such without further purification.

Example 6

The mixture of 4.8 g. 2-bromomethyl-5-methoxy-2,3-dihydrobenzofuran, 3.8 g. 4-(4-methoxyphenyl) - piperidine, 50 ml. isopropanol and 5 g. sodium carbonate is refluxed for 72 hours while stirring and evaporated in vacuo. The residue is taken up in diethyl ether, the mixture filtered, the filtrate extracted with 5% hydrochloric acid and the acidic solution made basic with ammonia. It is extracted with diethyl ether, the extract dried, filtered and evaporated, to yield the 1-(5-methoxy-2,3-dihydro-2-benzofurylmethyl)-4-(4 - methoxyphenyl) - piperidine of the formula

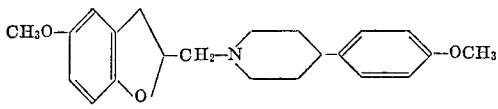

showing in the I.R. spectrum strong bands at 806, 1022 and 1234 cm.$^{-1}$.

The starting material is prepared as follows: To the mixture of 114 g. 4-methoxy-benzaldehyde and 218 g. ethyl acetoacetate, 7.5 ml. piperidine are added dropwise at 0° while stirring and the mixture is allowed to stand at 10° for 2 days. The precipitate formed is filtered off, added portionwise to the solution of 175 g. potassium hydroxide in 120 ml. water while stirring and maintaining the temperature between 90–95°. After 2 hours the mixture is diluted with water, washed with diethyl ether, acidified with hydrochloric acid and extracted with ethyl acetate. The extract is dried, filtered, evaporated and the residue recrystallized from benzene-petroleum ether, to yield the β-(4-methoxyphenyl)-glutaric acid melting at 155–160°.

The solution of 5 g. thereof in 25 ml. acetyl chloride is refluxed for 3½ hours and evaporated in vacuo. The anhydride formed is taken up in 50 ml. acetic acid and 16 g. ammonium acetate are added while cooling and stirring. The mixture is allowed to stand at room temperature overnight, diluted with water and the precipitate formed filtered off, to yield the β-(4-methoxyphenyl)-glutarimide melting at 160–165°.

Example 7

The mixture of 3 g. 2-bromomethyl-5-methoxy-2,3-dihydrobenzofuran, 2.1 g. 3-(2-methoxyphenyl)-pyrrolidine, 35 ml. isopropanol and 3 g. sodium carbonate is refluxed for 72 hours while stirring and evaporated in vacuo. The residue is taken up in diethyl ether, the mixture filtered, the filtrate extracted with 5% hydrochloric acid and the acidic solution made basic with ammonia. It is extracted with diethyl ether, the extract dried, filtered and evaporated, to yield the 1-(5-methoxy-2,3-dihydro-2-benzofurylmethyl) - 3-(2-methoxyphenyl)-pyrrolidine of the formula

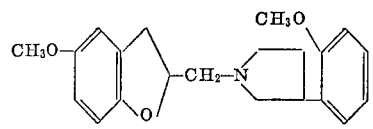

showing in the I.R. spectrum bands at 748, 1027 and 1245 cm.$^{-1}$.

The starting material is prepared as follows: The mixture of 10 g. α-(2-methoxyphenyl)-succinic acid (U.S. 2,975,193) and 20 ml. concentrated aqueous ammonia is slowly evaporated until the melt reached 200°. After 20 minutes, it is poured onto ice and the mixture extracted with chloroform. The extract is washed with aqueous sodium bicarbonate, dried and evaporated, to yield the α-(2-methoxyphenyl)-succinimide, melting at 137–142°.

The solution of 2 g. thereof in 300 ml. diethyl ether is added dropwise to the suspension of 2 g. lithium aluminum hydride in 50 ml. diethyl ether while stirring. After refluxing for 6 hours and cooling, 2 ml. water, 4 ml. 12% sodium hydroxide and 6 ml. water are added, the mixture filtered and the filtrate extracted with 5% hydrochloric acid. The acidic solution is made basic with ammonia, extracted with diethyl ether, the extract dried, filtered and evaporated, to yield the 3-(2-methoxyphenyl)-pyrrolidine.

Example 8

According to the methods illustrated by the previous examples, the following compounds are prepared from equivalent amounts of the corresponding starting materials:

(a) 1-(5-methyl-2,3-dihydro-2-benzofurylmethyl)-4-(2-methylphenyl)-piperidine;
(b) 1-(7-methoxy-2,3-dihydro-2-benzofurylmethyl)-4-(2-pyridyl)-piperidine;
(c) 1-(7-acetyl-2,3-dihydro-2-benzofurylmethyl)-4-phenyl-3-piperidine;
(d) 1-(5-methoxy-2,3-dihydro-2-benzofurylmethyl)-4-(2-methoxyphenyl)-3-piperidine;
(e) 1-(5-methoxy-2,3-dihydro-2-benzofurylmethyl)-4-(2,4-dimethoxyphenyl)-piperidine;
(f) 1-(5-methoxy-2,3-dihydro-2-benzofurylmethyl)-4-(3,4,5-trimethoxyphenyl)-piperidine;
(g) 1-(5,6-dimethoxy-2,3-dihydro-2-benzofurylmethyl)-4-phenyl-3-piperidine or the hydrochlorides or hydrobromides of these compounds.

Example 9

Preparation of 10,000 tablets each containing 25.0 mg. of the active ingredient:

| Formula: | G. |
|---|---|
| 1 - (5-methoxy-2,3-dihydro-2-benzofurylmethyl) - 4 - phenyl-3-piperidine hydrochloride | 250.00 |
| Lactose | 1,956.00 |
| Corn starch | 90.00 |
| Polyethylene glycol 6,000 | 90.00 |
| Talcum powder | 90.00 |
| Magnesium stearate | 24.00 |
| Purified water q.s. | |

Procedure: All the powders are passed through a screen with openings of 0.6 mm. The drug substance, lactose, talcum, magnesium, stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

I claim:
1. A compound of the formula

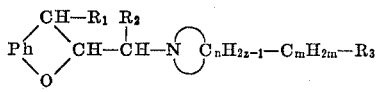

wherein Ph is 1,2-phenylene, (lower alkyl)-1,2-phenylene, mono- or di-(lower alkoxy)-1,2-phenylene, (lower alkylmercapto) - 1,2 - phenylene, (halogeno)-1,2-phenylene, (trifluoromethyl)-1,2-phenylene or (lower alkanoyl)-1,2-phenylene, each of $R_1$ and $R_2$ are hydrogen or lower alkyl, $R_3$ is phenyl, (lower alkyl)-phenyl, mono- or di-(lower alkoxy)-phenyl, (lower alkylmercapto)-phenyl, (halogeno)-phenyl, (trifluoromethyl)-phenyl, (lower alkanoyl)-phenyl, pyridyl or (lower alkyl)-pyridyl, $C_nH_{2z-1}$ is 1,5-pent-2-enylene and $m$ is an integer from 0 to 4, or therapeutically useful acid addition salts thereof.

2. A compound as claimed in claim 1 and corresponding to the formula

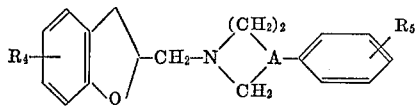

in which each of $R_4$ and $R_5$ is hydrogen, methyl, methoxy or chloro and A is

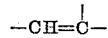

or therapeutically useful acid addition salts thereof.

3. A compound as claimed in claim 2 and being the 1-(5 - methoxy-2,3-dihydro-2-benzofurylmethyl)-4-phenyl-3-piperidine or a therapeutically useful acid addition salt thereof.

References Cited

UNITED STATES PATENTS 3,476,760   11/1969   Kaiser et al. _____ 260—293.4

ALAN L. ROTMAN, Primary Examiner

U.S. Cl. X.R.

260—295-S, 297-B; 424—263, 266